(12) United States Patent
Nimura et al.

(10) Patent No.: US 7,661,771 B2
(45) Date of Patent: Feb. 16, 2010

(54) SPEED SENSOR FITTING STRUCTURE

(75) Inventors: Taisuke Nimura, Saitama (JP); Takashi Ashigai, Saitama (JP); Toshiyuki Iwai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 540 days.

(21) Appl. No.: 11/370,848

(22) Filed: Mar. 9, 2006

(65) Prior Publication Data

US 2006/0202553 A1 Sep. 14, 2006

(30) Foreign Application Priority Data

Mar. 9, 2005 (JP) .............................. 2005-064878

(51) Int. Cl.
*B60T 8/32* (2006.01)
(52) U.S. Cl. .................... 303/137; 303/168; 188/26; 73/493; 324/173; 324/166; 180/219
(58) Field of Classification Search ................ 303/168, 303/137; 180/219; 324/163, 166, 173, 174, 324/207.2, 207.25; 301/6.8, 105.1; 188/26; 73/491, 493, 494, 489, 495, 496, 499
See application file for complete search history.

(56) References Cited

U.S. PATENT DOCUMENTS

| | | | | |
|---|---|---|---|---|
| 4,660,683 A | * | 4/1987 | Hayashi et al. ........... 188/18 A |
| 4,744,606 A | * | 5/1988 | Yoshida ....................... 301/6.3 |
| 5,092,421 A | * | 3/1992 | Tsurumaki et al. .......... 180/219 |
| 6,112,841 A | * | 9/2000 | Iwai et al. ................... 180/219 |
| 6,492,805 B1 | * | 12/2002 | Wakabayashi et al. ...... 324/173 |
| 7,274,188 B2 | * | 9/2007 | Ishida ......................... 324/173 |
| 7,322,437 B2 | * | 1/2008 | Toyoda ........................ 180/219 |
| 2003/0019677 A1 | | 1/2003 | Wotton |
| 2005/0247499 A1 | * | 11/2005 | Toyoda ........................ 180/219 |

FOREIGN PATENT DOCUMENTS

| | | | | | |
|---|---|---|---|---|---|
| JP | 4-256860 A | * | 9/1992 | ................. | 324/166 |
| JP | 8-133154 A | * | 5/1996 | | |
| JP | 2001-301675 A | * | 10/2001 | | |
| JP | 2002-29395 A | * | 1/2002 | | |

* cited by examiner

*Primary Examiner*—Robert A Siconolfi
*Assistant Examiner*—Mariano Sy
(74) *Attorney, Agent, or Firm*—Birch, Stewart, Kolasch & Birch, LLP (57) ABSTRACT

When a vehicle speed sensor is provided as a separate unit, the vehicle sensor should be removed when a vehicle wheel is changed. A brake caliper is fitted to an upper stay and a lower stay formed at a lower part of the front fork supporting the front wheel. The sensor stay is fitted to the inside of the lower stay in the vicinity of the brake caliper. A sensor cover is fastened integrally in an overlapping manner to the outside of the sensor stay. A projection formed on the sensor cover overlaps with a fitting bolt of the brake caliper. Thus, it is not possible to remove the brake caliper without first removing the sensor cover. Further, a vehicle speed sensor is sandwiched by the sensor stay and the lower end of the sensor cover and the three members are fastened together.

18 Claims, 6 Drawing Sheets

SPEED SENSOR FITTING STRUCTURE

CROSS-REFERENCE TO RELATED APPLICATIONS

The present application claims priority under 35 USC 119 to Japanese Patent Application No. 2005-064878 filed on Mar. 9, 2005 the entire contents of which are hereby incorporated by reference.

FIELD OF THE INVENTION

The present invention relates to a structure for fitting a vehicle speed sensor to a front fork of a motorcycle.

DESCRIPTION OF BACKGROUND ART

Vehicle sensors for detecting pulses of a pulser ring that are rotating integrally with a front wheel by using magnetic change in a non-contact manner are well-known. In the event that this vehicle speed sensor is provided for a motorcycle of the type where a brake caliper is fitted to a front fork via a carry bracket, it is possible to fit the vehicle speed sensor to the carry bracket. On the other hand, with motorcycles where a brake caliper is fitted directly to a front fork without using a caliper bracket, the vehicle speed sensor is fitted directly to the front fork or is fitted to the front fork via a dedicated stay. See, Japanese patent application No. 2002-29395.

However, in the event that a vehicle speed sensor is fitted to a front fork either directly or via a stay, when the brake caliper is removed, for example, when the front wheel is detached or attached etc., there are cases where detachment of the vehicle speed sensor is forgotten and the front wheel is detached with the vehicle speed sensor remaining on the front fork. At this time, it is necessary to take into consideration the direct contact between the brake disc and the pulser ring and the operability is therefore not good. It is therefore advantageous for this application to provide a fitting structure for fitting a vehicle speed sensor to a front fork where the operability is good at the time of removal of a brake caliper.

SUMMARY AND OBJECTS OF THE INVENTION

In order to resolve the aforementioned problems, it is an object of an embodiment of the present invention to provide a vehicle speed sensor fitting structure for a motorcycle wherein a brake caliper is directly fitted to a front fork, a ring-shaped pulser is arranged at a wheel of a rear wheel, and vehicle speed is detected by reading pulses using a vehicle speed sensor fitted at a front fork in a non-contacting manner for detecting magnetic change. The vehicle speed sensor is fitted to the front fork via a sensor stay with a sensor cover for protecting the sensor being fitted to the sensor stay. The removal of the brake caliper is limited by the sensor cover.

It is an object of an embodiment of the present invention to provide the sensor cover having a portion overlapping in a direction of attachment and detachment of a fitting bolt for the brake caliper.

It is an object of an embodiment of the present invention to provide a portion where the sensor cover, vehicle speed sensor and sensor stay are fastened together by a common fitting bolt.

It is an object of an embodiment of the present invention to provide a cable clamp for the vehicle speed sensor that is provided at the sensor cover.

According to an embodiment of the present invention, a vehicle speed sensor is fitted to the front fork via a sensor stay. A sensor cover for protecting the sensor is fitted to this sensor stay. The removal of the brake caliper is restricted by the sensor cover. It is therefore necessary to remove the sensor cover in advance while removing the brake caliper. Because of this, when the brake caliper is removed, the necessity of removing the vehicle speed sensor is recognized in accompaniment with the removal of the sensor cover. Thus, to forget to remove the speed sensor is prevented, and contact between the vehicle speed sensor and the brake disc and/or pulser ring can be avoided in advance. As a result, since it is not possible to forget to remove the speed sensor, it is not necessary to take into consideration any contact between the vehicle speed sensor and the brake disc etc. Thus, the operability is improved.

According to an embodiment of the present invention, the sensor cover has a portion overlapping in the attachment and detachment direction of the fitting bolt with respect to the brake caliper. Therefore, if the sensor cover is not removed in advance, it is not possible to remove the brake caliper fitting bolt, and the necessity of removing the sensor cover together with the vehicle speed sensor is reliably reinforced.

According to an embodiment of the present invention, there is provided a portion where the sensor cover, vehicle sensor and sensor stay are fastened together by a common fastening bolt. Therefore, when the sensor cover is removed, the vehicle sensor is removed together, and forgetting to remove the vehicle sensor is reliably prevented.

According to an embodiment of the present invention, it is possible for the sensor cover to be combined with a vehicle speed sensor cable clamp section. Thus, a multifunctionality of the parts is achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
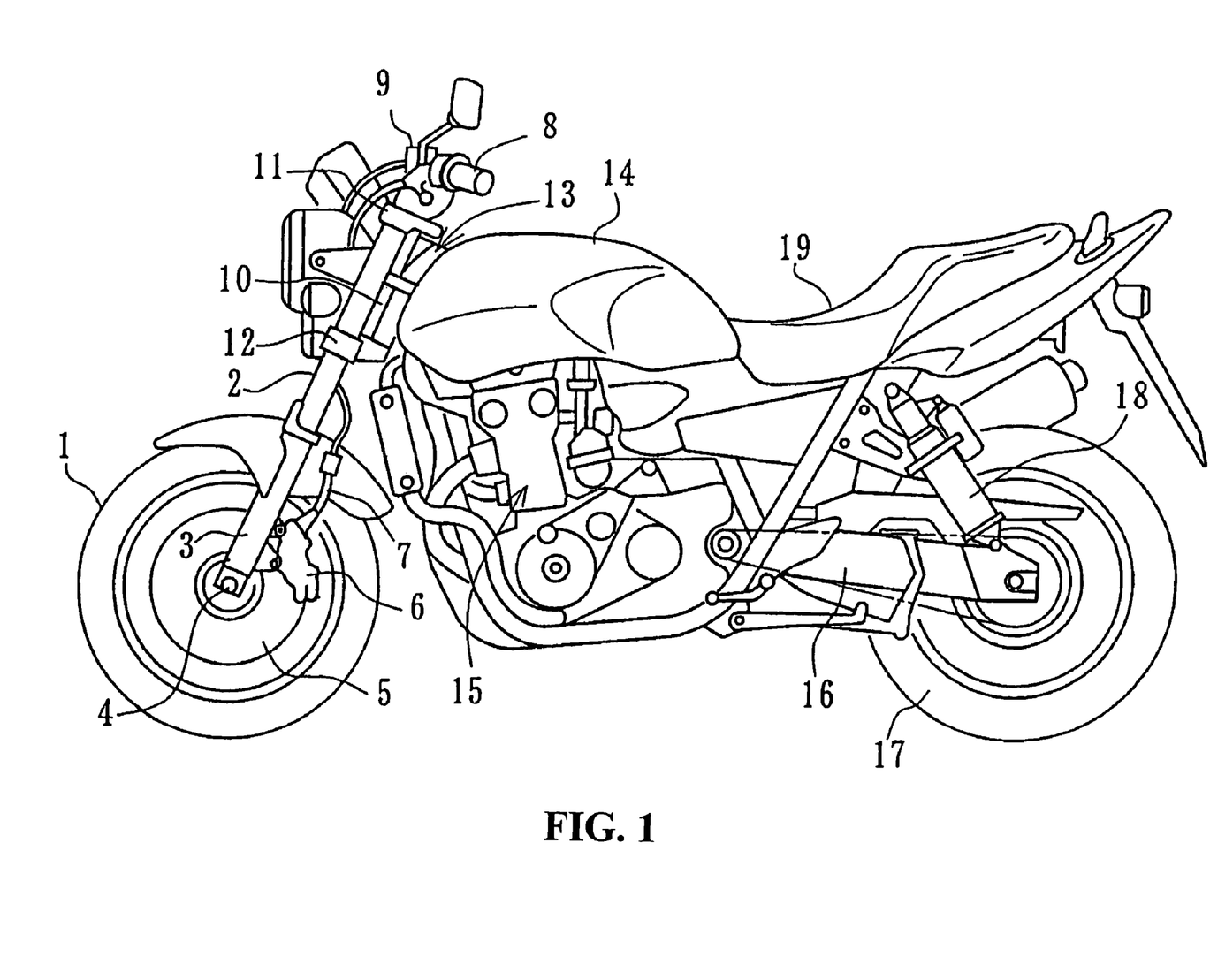
FIG. 1 is a side view of a motorcycle of this embodiment.

The following is a description of a preferred embodiment based on the drawings. FIG. 1 is a side view of a motorcycle according to an embodiment of the invention. A front wheel 1 is supported by a vehicle axis 4 at a lower end of a bottom case 3 at a lower end of a pair of left and right front forks 2.

A brake disc 5 is provided on the same axis as the vehicle axis 4 at the front wheel 1 and a brake caliper 6 for making sliding contact with the brake disc 5 is directly fitted to a side surface at a rear end of the bottom case 3. A hydraulic cable 7 extends upwards along the front forks 2 from the brake caliper 6 and passes through a master cylinder 9 provided in the vicinity of a handlebar grip 8.

The upper section of the front fork 2 is supported in a freely rotating manner with respect to a head pipe 10 via a top bridge 11 and bottom bridge 12. The head pipe 10 is provided at a front end of a vehicle frame 13. A fuel tank 14 is disposed adjacent to a liquid-cooled four-stroke engine 15. A rear arm 16 is provided with is a rear wheel 17 and a rear suspension 18. A seat 19 is mounted on the vehicle frame.

Figure 2:
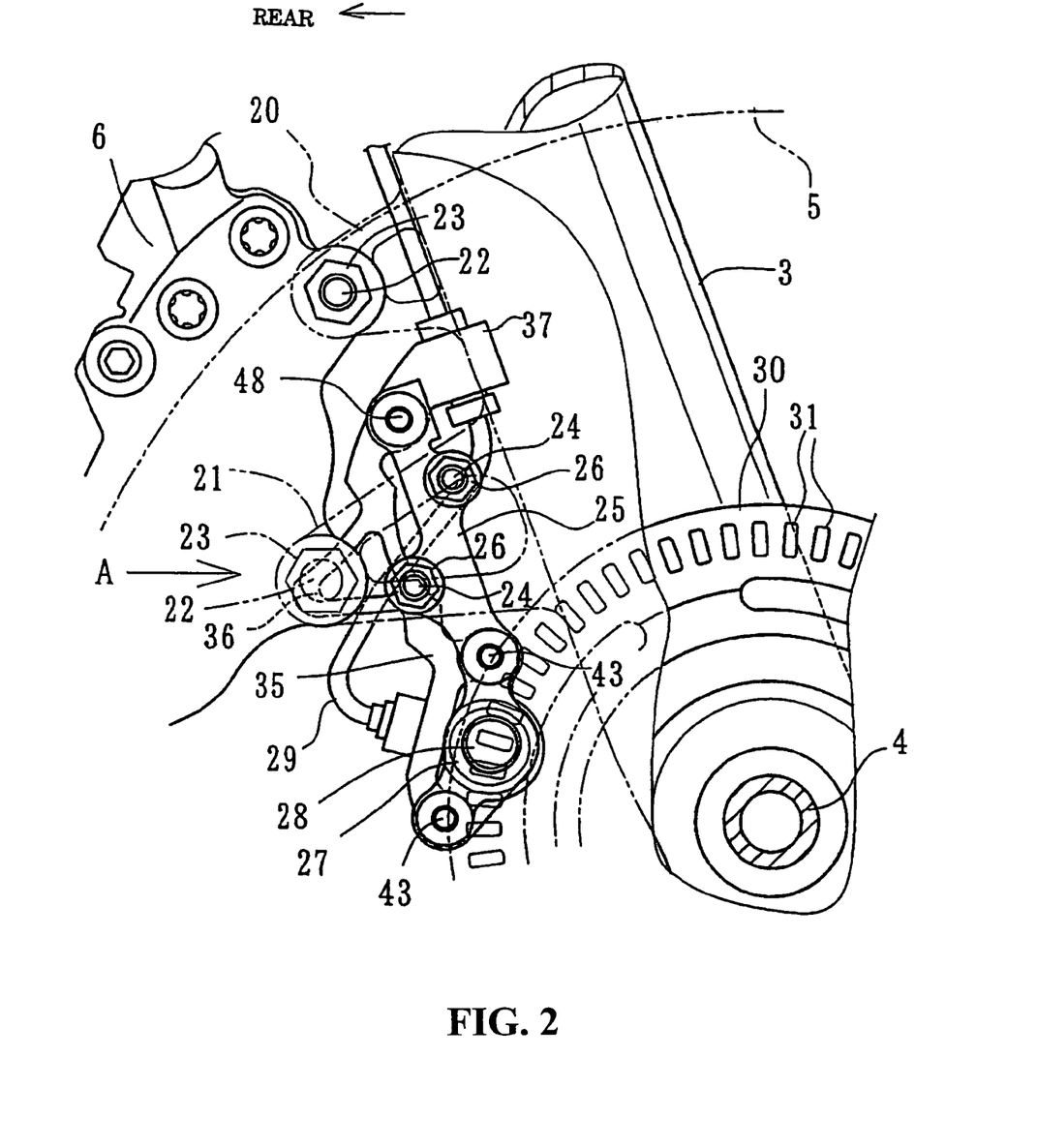
FIG. 2 is a view showing a cross-section of the portion in the direction of arrow A of FIG 1.

FIG. 2 is a view showing a portion of brake caliper 6 fitted to bottom case 3 on the right side of the vehicle body from the inside (center side of the vehicle). A bolt 22 and nut 23 are fitted to an upper stay 20 and a lower stay 21 that are formed to project integrally to the rear from a rear side surface of the bottom case 3 towards the brake caliper 6 so as to be fitted directly to the bottom case 3 without a caliper bracket being interposed therebetween.

The upper stay 20 and lower stay 21 are formed so as to leave a gap in a vertical direction at the rear side surface of the bottom case 3, with the lower stay 21 projecting further to the rear than the upper stay 20, and with the brake caliper 6 being supported so as to incline downwards to the rear by the upper stay 20 and lower stay 21.

A stud bolt 24 projects to the inside at the lower stay 21, and a sensor stay 25 is then fitted in a freely detachable manner from the inside using a nut 26. The sensor stay 25 is a rigid member composed of an appropriate metal material such as die-cast aluminum that extends in a vertical direction substantially along the brake caliper 6 so as to be orthogonal to lower stay 21. A vehicle speed sensor 28 is supported at a sensor holder section 27 of the lower part.

The vehicle speed sensor 28 faces the outer peripheral section of the pulser ring 30 in a non-contact state. The pulser ring 30 is supported by vehicle axis 4 on the same axis as the front wheel 1, with pulse holes 31 (only partially represented by the numerals) being formed in a peripheral direction at regular intervals at an outer periphery section. The vehicle speed sensor 28 is a well-known device for measuring speed by detecting the passage of pulse holes 31 through magnetic change.

The outside of the sensor stay 25 is then covered from the outside by a sensor cover 35 so that the vehicle speed sensor 28 is covered from the outside. The sensor cover 35 is made of an appropriate metal such as aluminum etc. so as to be thinner than the sensor stay 25 and is vertically fastened with the sensor stay 25. A projecting section 36 overlapping with the fitting bolt 22 is provided in an integral manner at a central section to as to substantially overlap with the lower stay 21 and reach as far as a top section.

A gap is formed between the sensor stay 25 and the sensor cover 35 with a sensor cable 29 for the vehicle speed sensor 28 being wired through this gap. The sensor cable 29 extends upwards from the vehicle speed sensor 28, bends, and runs towards the bottom case 3, bends in the vicinity of the bottom case 3, runs along the bottom case 3 and extends upwards. The sensor cable 29 in the vicinity of the bent section of the bottom case 3 is supported by a cable clamp section 37 formed integrally towards the upper end of the sensor cover 35.

Figure 3:
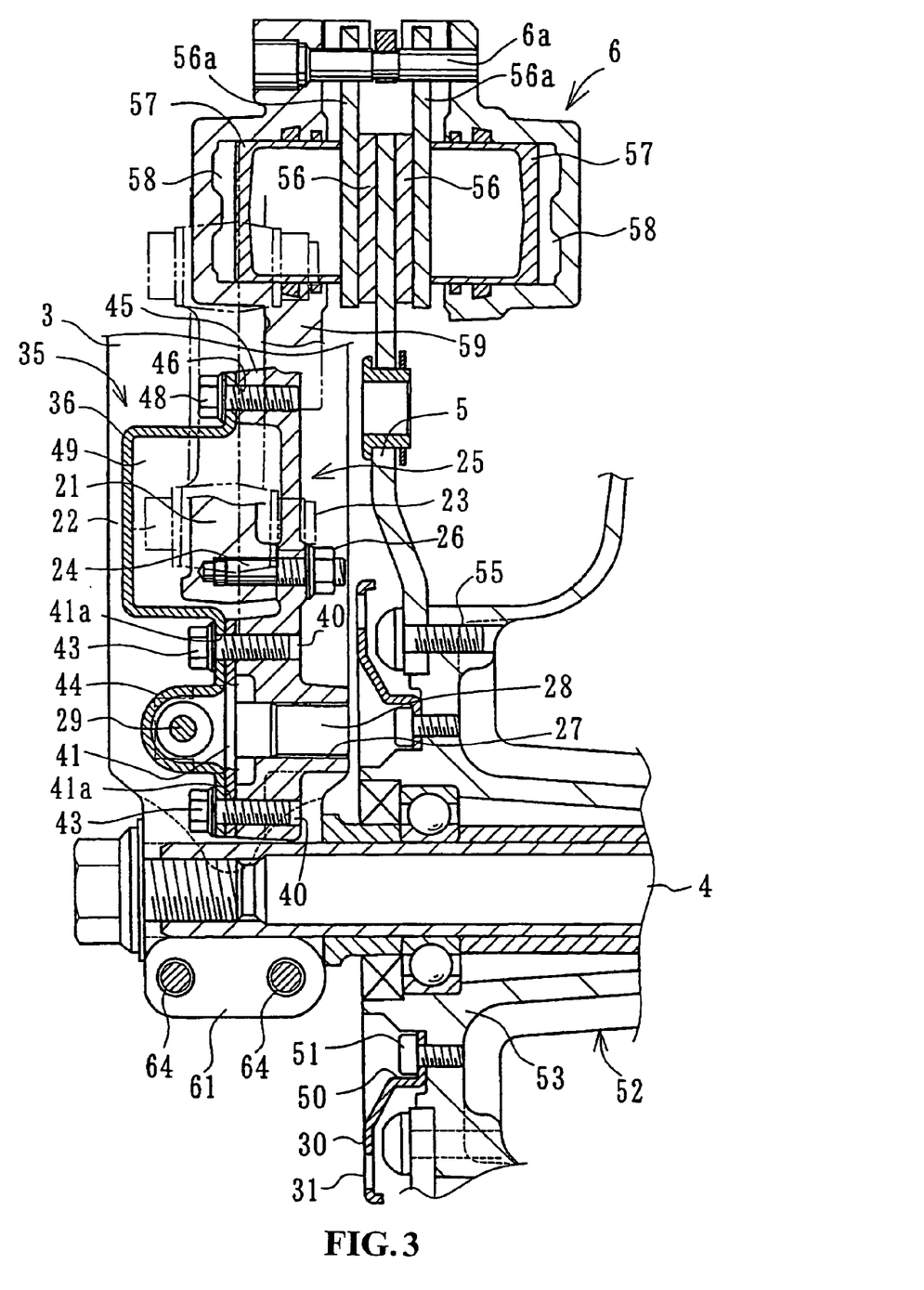
FIG. 3 is a view showing the vehicle speed sensor fitting section from the rear.

FIG. 3 is a view showing a structure for fitting the vehicle speed sensor 28 by lining up the sensor 25 and the sensor cover 35 in cross-section from the direction of arrow A in FIG. 2. For convenience, the vehicle speed sensor fitting section is shown with the peripheral brake caliper 6, front wheel and pulser ring etc. being moved for convenience. As shown in the drawing, a central part of the sensor stay 25 is fixed to the stud bolt 24 projecting to the inside from the lower stay 21 using the nut 26. As a result, the fitting section is not visible from the outside and the external appearance of the vehicle speed sensor fitting section is acceptable.

Nut holes 40, 40 are formed at two locations positioned so as to sandwich the vehicle speed sensor 28 at the sensor holder section 27. A flange 41 of the vehicle speed sensor 28 overlaps at an outer surface side of the sensor holder section 27, and a lower section of the sensor cover 35 overlaps to the outside. Through-holes 42, 42 (refer to FIG. 7) provided at a lower part of the sensor cover 35 and through-holes 41a, 41a provided at a flange 41 coincide with the nut holes 40, 40 so that the three members are fastened at one time from outside using bolts 43, 43.

A portion overlapping with the vehicle speed sensor 28 of the sensor cover 35 forms a relief section 44 curving in a convex manner to the outside with the sensor cable 29 being passed through here.

A nut hole 46 is also formed at an upper boss 45 formed at an upper end of the sensor stay 25, and a through-hole 47 (refer to FIG. 7) is formed at an upper end of the sensor cover 35 on the outside overlapping and being fastened together using a bolt 48 from the outside.

A portion corresponding to projecting section 36 at a central section of the sensor cover 35 projects to the outside in a substantial inverted C-shape in the state shown in the drawings. A substantially quadrilateral-shaped gap 49 passing in a vertical direction between the sensor stays 25 is formed, and the sensor cable 29 is passed through this gap 49 from above to below (refer to FIG. 2).

Further, a lower stay 21 is positioned within the gap 49, and a fitting section of the brake caliper 6 is positioned so as to overlap with the lower stay 21 in the state shown in the drawings. Projecting section 36 then overlaps as viewed from the side (state in FIG. 2) with a gap to the outside of the lower stay 21. Further, the projection 36 is formed at a position overlapping in the direction of the attachment and detachment of the bolt 22, so that the bolt 22 interferes at the time of attachment and detachment. It is therefore necessary to first remove the sensor cover 35 when removing the bolt 22 to extract the brake caliper 6.

A pulser ring 30 is fitted to a side surface wall of the hub 53 formed at a front wheel 52 using a bolt 51 within an insertion recess 50 formed at a central section in a radial direction in a direction towards the inside.

An inner peripheral section of the brake disc 5 forming an approximate donut shape is fitted using a bolt 55 at a peripheral side from hub 53 in the vicinity of the fitting section. A brake and brake pads 56, 56 make slidaeble contact inside and outside at an outer peripheral section of the brake disc 5. The brake pads 56, 56 are supported by a slide pin 6a inserted at the brake caliper 6 via plates 56a, 56a. The brake pads 56, 56 move mutually facing a direction of sliding contact with the brake disc 5 as a result of the oil pressure of the cylinders 58, 58 being made high by each piston 57, 57.

Fitting section 59 formed at one half of the brake caliper 6 is fitted so as to overlap with the upper stay 20 (cannot be seen in this drawing) and lower stay 21 and only one half is fixed to the side of the bottom case 3. The caliper bracket is therefore omitted so as to enable direct fitting to the bottom case by employing a brake caliper 6 with facing pistons.

Figure 4:
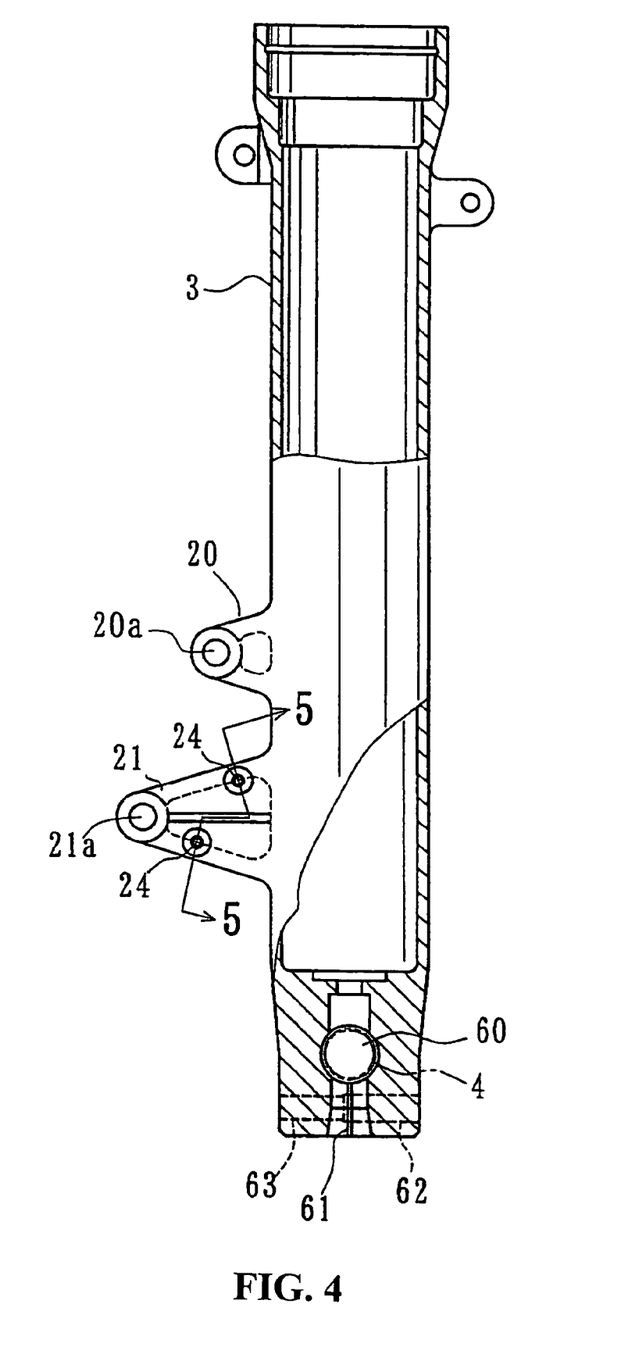
FIG. 4 is a view showing a brake caliper from the inside.

FIG. 4 is a view showing the left side bottom case 3 from the inside. Of the upper and lower sides of the lower stay that substantially form a triangle, stud bolts 24 are provided on different levels in the vicinity of the base section on the side of the upper edge and in the vicinity of the top of the lower edge side. Bolt through-holes 20a, 21a are provided at the upper stay 20 and lower stay 21, respectively, with bolts 22 (FIG. 2) passing through the through holes.

An axle hole 60 is provided for passing the axle 4 through at the lower end of the bottom case 3. A dividing channel 61, reaching from the lower part of this axle hole 60 to the lower end section, is formed. A through-hole 62 and nut hole 63 are provided in a direction orthogonal with the dividing channel 61 with bolts 64 (FIG. 3) being inserted and fastened so as to close the dividing channel 61.

Figure 5:
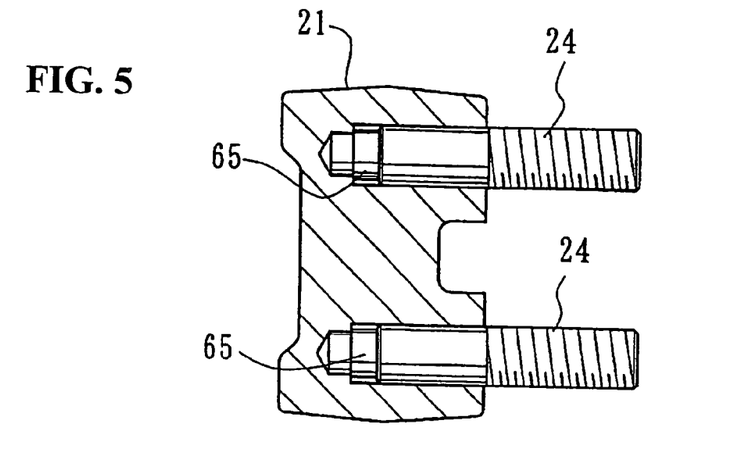
FIG. 5 is a side view along line 5-5 of FIG. 4.

FIG. 5 corresponds to a cross-section along line 5-5 of FIG. 4, where one end of a stud bolt 24 is fitted through press-fitting to an insertion hole 65 opened in a direction towards the inside of the lower stay 21.

Figure 6:
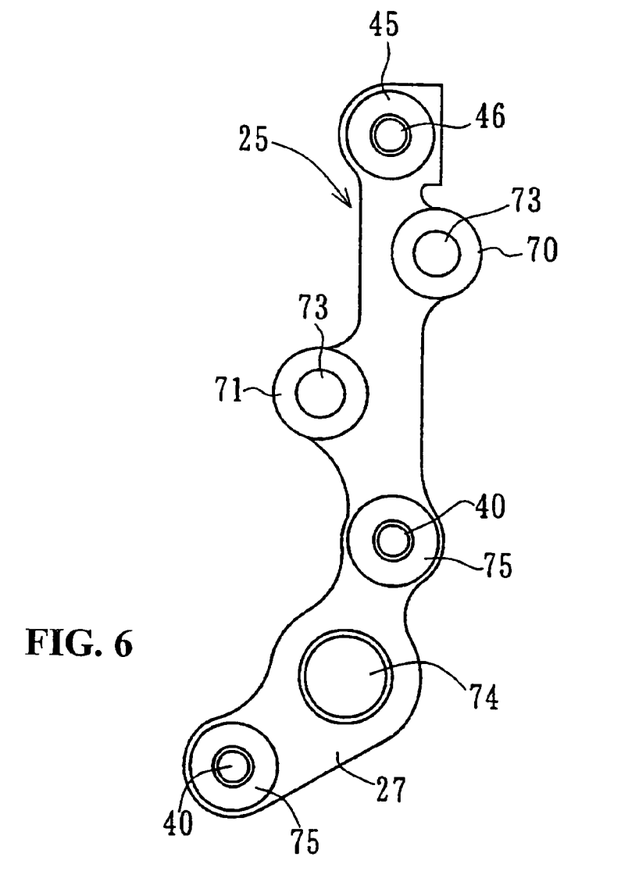
FIG. 6 is a side view of a sensor stay.

FIG. 6 is an enlarged view showing a sensor stay 25 from the same direction as FIG. 2. An upper boss 45 is provided at an upper end of the sensor stay 25, where a nut hole 46 is provided. At a central section, bosses 70, 71 are provided and formed offset so as to project in opposite directions, with respective through-holes 73 being provided through which stud bolts 24 pass.

The sensor holder 27 of the lower section is bent so as to incline downwards. A sensor hole 74 is provided with the vehicle speed sensor 28 fitting at a central section and being provided by implementing serration, with the vehicle speed sensor 28 being positioned and inserted therein. Bosses 75 are formed to the left and right so as to sandwich the sensor hole 74, and respective nut holes 40, 40 are formed.

Figure 7:
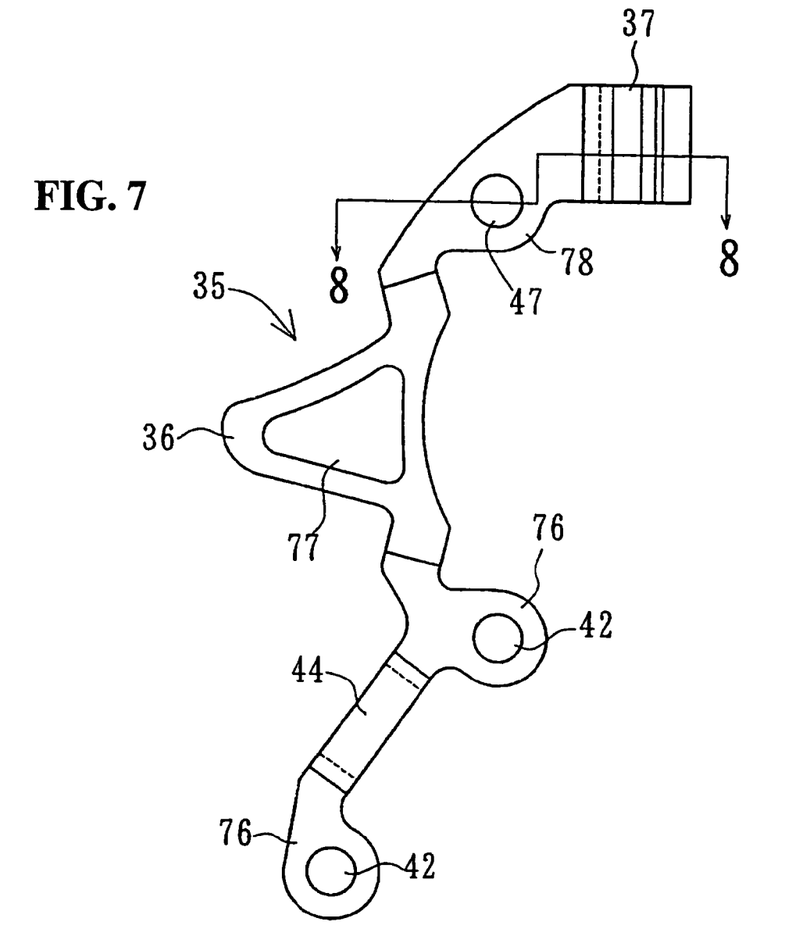
FIG. 7 is a side view of a sensor cover.

FIG. 7 is a view showing the sensor cover 35 from the same direction as in FIG. 2, with bosses 76, 76 being provided so as to form through-holes on both sides so as to sandwich a run-away section 44 at a lower end section. A projecting section 36 of the central part forms a substantially triangular shape and a lightening hole 77 is formed. A boss 78 is provided between the projection section 36 and the cable clamp section 37, with a through-hole 47 being formed here, so that the bosses 45 and nut holes 46 of the respective sensor stays 25 overlap.

Figure 8:
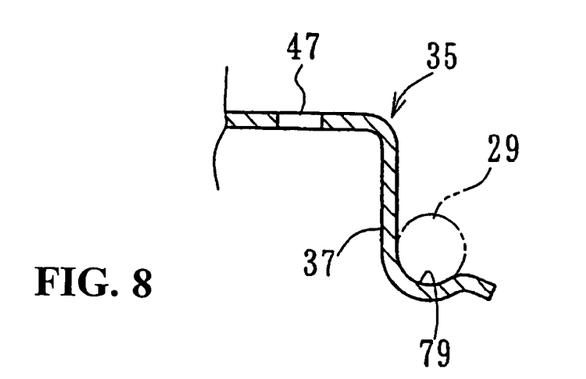
FIG. 8 is a cross sectional view along line 8-8 of FIG. 7.

FIG. 8 is a view showing a cross-section along line 8-8 of FIG. 7 for the cable clamp section 37, with an end side being bent substantially at a right angle. A circular arc-shaped recess section 79 is formed so as to support the sensor cable 29. By providing the cable clamp 37, the sensor cover 35 also functions as a holder for the sensor cable 29 so as to achieve component multi-functionality.

Next, the operation will be described. As shown in FIG. 2 and FIG. 3, the brake disc 5, brake caliper 6 on the outside of the pulser ring 30, and vehicle speed sensor 28 are positioned so as to hinder removal of the front wheel. It is therefore necessary to remove the brake caliper 6 and vehicle speed sensor 28 to ensure that the brake disc 5 and pulser ring 30 do not interfere.

However, the projecting section 36 of the sensor cover 35 is positioned in the attaching and detaching direction of the bolt 22 for fitting to the lower stay 21 of the brake caliper 6 and therefore prevents removal. It is therefore necessary to first remove the sensor cover 35. Removal of the sensor cover 35 may be achieved by removing the bolts 43 and 48 outwards.

In this way, when the brake caliper 6 is removed, before this, it is essential that the sensor cover 35 is removed. This brings a strong awareness in preventing an individual from forgetting to remove the vehicle speed sensor 28. Thus, the vehicle speed sensor 28 is prevented from making contact with the brake disc 5 and pulser ring 30 since an individual did not forget to remove the speed sensor 28. As a result, it is not necessary to take into consideration any contact between the vehicle speed sensor 28, for which removal has been forgotten, and the brake disc 5 etc. Thus, the operability at the time of removing the brake caliper 6 is improved.

At this time, the bolts 43 fasten the flange 41 of the vehicle speed sensor 28 and the sensor stay 25 together. When the bolts 43 are loosened and removed so that the sensor cover 35 is removed, the vehicle speed sensor 28 can also be moved together. This prevents an individual from forgetting to remove the vehicle speed sensor 28 and further strengthens awareness of this point.

Further, the brake caliper 6 adopts facing-type pistons. With single action-type brake calipers, the caliper bracket is not necessary with this mechanism. Thus, a direct fitting to the bottom case 3 is possible. Because of this, while fitting the vehicle speed sensor 28, it is not possible to utilize and fit a caliper bracket, as is the case with a motorcycle where a brake caliper is fitted via a caliper bracket.

However, when a vehicle speed sensor 28 is directly fitted to a front fork 2, it is necessary to provide a relatively large boss in an integral manner for use in fitting the vehicle speed sensor at the bottom case 3 that is usually a casting. This makes the front fork 2 larger. In addition, the front fork 2 is also inconvenient with regards to the weight and external appearance. From this viewpoint, in this embodiment, these drawbacks are avoided by providing a dedicated sensor stay 25 for use in fitting the vehicle speed sensor 28. Further, stud bolts 24 constituting fitting members for the sensor stay 25 project to the inside. These are then fastened with nuts from the inside so that there is no detriment to the external appearance at the fitting section.

The present invention is by no means limited to the above embodiments, and various modifications and applications are possible within the scope of this invention. For example, the sensor cover 35 is by no means limited to the structure of this embodiment, and various cover structures that protect the vehicle speed sensor 28 are possible. Moreover, the fitting target of the vehicle speed sensor 28 is by no means limited to the bottom case, and the front fork 2 is also sufficient, with inverted types also being included by this front fork.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle speed sensor fitting structure for a motorcycle where a brake caliper is directly fitted to a front fork, a ring-shaped pulser is arranged at a wheel of a front wheel, and vehicle speed is detected by reading pulses using a vehicle speed sensor fitted at a front fork in a non-contacting manner detecting magnetic change comprising:
   a sensor stay for fitting the vehicle speed sensor to the front fork;
   a sensor cover for protecting the vehicle speed sensor, said sensor cover being fitted to the sensor stay; and
   a common fitting bolt which extends through a hole in the sensor cover, a hole in a flange of the vehicle speed sensor, and into a nut hole of the sensor stay, so that the sensor cover, the vehicle speed sensor and the sensor stay are fastened together, wherein removal of the brake caliper is limited to first require the removal of the sensor cover.

2. The vehicle speed sensor fitting structure according to claim 1, wherein the sensor cover has a portion overlapping in a direction of attachment and detachment of a fitting bolt for the brake caliper.

3. The vehicle speed sensor fining structure according to claim 1, wherein a cable clamp portion for the vehicle speed sensor is provided at the sensor cover.

4. The vehicle speed sensor fining structure according to claim 1, wherein said sensor stay is fitted in a detachable manner to a lower stay.

5. The vehicle speed sensor fitting structure according to claim 1, wherein said brake caliper includes a predetermined number of attachment members for securing the brake caliper relative to the front fork, said sensor cover including a projecting section for covering at least one of said attachment members for ensuring that the vehicle speed sensor is removed prior to removing the brake caliper.

6. The vehicle speed sensor fining structure according to claim 5, wherein said sensor cover includes mounting apertures that corresponding with mounting apertures of said sensor stay, and said projecting section extends outwardly from the sensor cover for covering at least one of said attachment members.

7. The vehicle speed sensor fitting structure according to claim 1, and further including a sensor cable operatively connected to said vehicle speed sensor,
wherein a relief section formed at a lower portion of said sensor cover functions as a holder for said sensor cable for guiding the sensor cable from the vehicle speed sensor to a cable clamp section at an upper portion of the sensor cover.

8. The vehicle speed sensor fitting structure according to claim 4, and further including an attachment member projecting inwardly from said lower stay for mounting said sensor stay relative thereto with the attachment member being hidden from view from the direction of said sensor cover.

9. The vehicle speed sensor fitting structure according to claim 5, wherein said projecting section is substantially triangular in shape and includes a central portion that is removed for reducing the weight of said sensor cover.

10. A vehicle speed sensor mounting structure for use with a motorcycle having a brake caliper mounted relative to a front fork with a vehicle speed sensor being mounted adjacent to said brake caliper for detecting a vehicle speed comprising:
a sensor stay for mounting the vehicle speed sensor relative to the front fork;
a sensor cover for protecting the vehicle speed sensor, said sensor cover being mounted to the sensor stay;
an attachment member for mounting the brake caliper relative to the front fork; and
a common fitting bolt which extends through a hole in the sensor cover, a hole in a flange of the vehicle speed sensor, and into a nut hole of the sensor stay, so that the sensor cover, the vehicle speed sensor and the sensor stay are fastened together,
said sensor cover being mounted to extend over at least one of said attachment member for first requiring removal of the sensor cover prior to removing the brake caliper.

11. The vehicle speed sensor mounting structure for use with a motorcycle according to claim 10, wherein the sensor cover has a portion overlapping in a direction of attachment and detachment of a mounting bolt for the brake caliper.

12. The vehicle speed sensor mounting structure for use with a motorcycle according to claim 10, wherein a cable clamp portion for the vehicle speed sensor is provided at the sensor cover.

13. The vehicle speed sensor mounting structure for use with a motorcycle according to claim 10, wherein said sensor stay is fitted in a detachable manner to a lower stay.

14. The vehicle speed sensor mounting structure for use with a motorcycle according to claim 10, wherein said brake caliper includes a predetermined number of attachment members for securing the brake caliper relative to the front fork, said sensor cover including a projecting section for covering at least one of said attachment members for ensuring that the vehicle speed sensor is removed prior to removing the brake caliper.

15. The vehicle speed sensor mounting structure for use with a motorcycle according to claim 14, wherein said sensor cover includes mounting apertures that corresponding with mounting apertures of said sensor stay, and said projecting section extends outwardly from the sensor cover for covering at least one of said attachment members.

16. The vehicle speed sensor mounting structure for use with a motorcycle according to claim 10, and further including a sensor cable operatively connected to said vehicle speed sensor,
wherein a relief section formed at a lower portion of said sensor cover functions as a holder for said sensor cable for guiding the sensor cable from the vehicle speed sensor to a cable clamp section formed an upper portion of the sensor cover.

17. The vehicle speed sensor mounting structure for use with a motorcycle according to claim 13, and further including an attachment member projecting inwardly from said lower stay for mounting said sensor stay relative thereto with the attachment member being hidden from view from the direction of said sensor cover.

18. The vehicle speed sensor mounting structure for use with a motorcycle according to claim 14, wherein said projecting section is substantially triangular in shape and includes a central portion that is removed for reducing the weight of said sensor cover.

* * * * *